United States Patent [19]

Cohn

[11] Patent Number: 4,957,945

[45] Date of Patent: * Sep. 18, 1990

[54] PREPARATION OF ULTRA HIGH MOLECULAR WEIGHT POLYESTER

[75] Inventor: Gerald Cohn, Akron, Ohio

[73] Assignee: The Goodyear Tire & Rubber Company, Akron, Ohio

[*] Notice: The portion of the term of this patent subsequent to Oct. 24, 2006 has been disclaimed.

[21] Appl. No.: 459,508

[22] Filed: Jan. 2, 1990

Related U.S. Application Data

[60] Division of Ser. No. 285,928, Dec. 19, 1988, Pat. No. 4,917,845, which is a continuation-in-part of Ser. No. 176,554, Apr. 1, 1988, Pat. No. 4,792,573.

[51] Int. Cl.$^5$ ............................................. C08G 63/00
[52] U.S. Cl. ........................................ 521/182; 521/56; 521/60; 521/919; 528/272; 528/308.2; 528/483; 528/502
[58] Field of Search .................. 521/56, 60, 182, 919; 528/272, 308.2, 483, 502

[56] References Cited

U.S. PATENT DOCUMENTS

| | | | |
|---|---|---|---|
| 3,586,647 | 6/1971 | Kremer | 521/182 |
| 4,416,839 | 11/1983 | Matsumura et al. | 521/64 |
| 4,419,308 | 12/1983 | Matsumura et al. | 521/64 |
| 4,517,315 | 5/1985 | Matsumura et al. | 521/64 |
| 4,613,664 | 9/1986 | Tate et al. | 528/274 |
| 4,742,151 | 5/1988 | Tate et al. | 528/272 |
| 4,755,587 | 7/1988 | Rinehart | 528/272 |

Primary Examiner—Morton Foelak
Attorney, Agent, or Firm—Alvin T. Rockhill

[57] ABSTRACT

There is a growing demand for high molecular weight polyester resin. For instance, the market for high molecular weight polyethylene terephthalate resin is rapidly expanding. High molecular polyethylene terephthalate resin is currently being used in vast quantities in manufacturing bottles for carbonated beverages, trays for frozen foods which can be heated in either microwave ovens or convection ovens, and in tire cord. There is a growing trend toward higher molecular weights in many applications for such polyester resins. Unfortunately, it becomes progressively more difficult and expensive to produce polyester resins having higher and higher molecular weights utilizing standard commercial polymerization techniques. This invention discloses a technique by which polyester resin having extremely high molecular weight can be prepared utilizing a very rapid solid state polymerization process. This invention more specifically discloses a process for preparing ultra-high molecular weight polyester resin which comprises: (1) dissolving a polyester prepolymer in a suitable organic solvent; (2) recovering the polyester prepolymer from the organic solvent to produce a porous, fibrous mass of the polyester prepolymer; and (3) solid state polymerizing the porous, fibrous mass at an elevated temperature to produce the ultra-high molecular weight polyester resin.

19 Claims, No Drawings

PREPARATION OF ULTRA HIGH MOLECULAR WEIGHT POLYESTER

This is a divisional of application Ser. No. 07/285,928, filed on Dec. 19, 1988 (now issued as U.S. Pat. No. 4,917,845) which continuation-in-part of application Ser. No. 07/176,554, filed on Apr. 1, 1988 (now issued as U.S. Pat. No. 4,792,573).

BACKGROUND OF THE INVENTION

There is a rapidly growing market for high molecular weight polyester resin. For instance, the market for polyethylene terephthalate bottle resin is rapidly expanding. There is also a large demand for polyethylene terephthalate having a high molecular weight for use in making reinforcements for rubber articles, such as tire cords. High molecular weight polyethylene terephthalate resin can also be used in manufacturing trays for frozen food which can be heated in either microwave ovens or convection ovens. There is a demand for higher and higher molecular weight resin in this application. For instance, there is a demand for polyethylene terephthalate tray resin which has an intrinsic viscosity of greater than 1.0 dl/g. However, polyethylene terephthalate resins having intrinsic viscosities of greater than 1.0 are not widely available due to technical difficulties associated with producing such resins utilizing standard commercial polymerization techniques. These difficulties consequently result in such resins which are produced utilizing standard commercial techniques being very expensive.

High molecular weight polyesters are commonly produced from low molecular weight polyesters of the same composition by solid state polymerization. The low molecular weight polyesters which are used in such solid state polymerizations can be prepared by conventional melt polymerizations. Solid state polymerization is generally considered advantageous in that the handling of high molecular weight ultra-high viscosity molten polymers is eliminated during the solid state polymerization phase. Thermal degradation during the solid state portion of the polymerization is also essentially avoided.

In melt polymerizations, molecular weight increases by esterification as well as transesterification. During the initial polymerization, esterification predominates. As the molecular weight increases, most of the carboxyl ends are consumed by esterification and water is eliminated. The final polycondensation occurs by transesterification and the elimination of glycol. The attainment of high molecular weight is hindered by reduced diffusion of the glycol polymerization by-product due to increased polymer viscosity.

In the solid state polymerization process for low surface area pellets or chips, polymerization proceeds primarily by esterification with the diffusion of water. The slower diffusion of glycol by-product makes transesterification difficult. However, polymerization of high surface area powders can proceed by transesterification due to the fact that there is a reduced mean free path for glycol removal.

The low molecular weight polyester prepolymers utilized in solid state polymerizations are generally in the form of pellets, chips, or finely divided powder. Such pellets can vary greatly in size; however, as a general rule, the smaller the size of the pellets of polyester prepolymer the faster the solid state polymerization with proceed. Such polyester prepolymers are generally converted from the amorphous to the crystalline state prior to solid state polymerization in order to raise their sticking temperature. This is done in order to keep the pellets or chips of polyester prepolymer from sticking together as a solid mass in the solid state polymerization reactor.

In the solid state polymerization of a polyester prepolymer, the polymerization is carried out at an elevated temperature which is below the melting point of the polyester resin. Such polymerizations are normally conducted in the presence of a stream of inert gas or under a vacuum. Solid state polymerizations are normally conducted on a commercial basis in the presence of a stream of inert gas since it serves to remove volatile reaction products and helps to heat the polyester.

Heretofore, the form of the polyester prepolymer has essentially dictated the type of solid state polymerization process which could be employed in order to convert the low molecular weight polyester prepolymer into high molecular weight polyester resin. For example, it has generally been accepted practice to use polyester prepolymer in the form of pellets or chips in vacuum and static bed processes and finely ground powder in fluidized bed processes. The reason for this is that experience has shown that finely ground powders tend to agglomerate in vacuum processes, resulting in slower polymerization rates and a need to regrind the high molecular weight polyester resin produced. Experience has also shown that, in static bed processes finely ground powders will channel or fissure, resulting in uneven polymerization and prolonged polymerization rates. On the other hand, the use of pellets or chips in fluidized bed processes is not economically feasible in view of the velocity and volume of inert gas needed to suspend the pellets or chips and the size of the equipment required to do so.

Polyester prepolymers which are in the form of finely divided powders solid state polymerize at faster rates than do polyester prepolymers which are in the form of pellets or chips. However, polyester prepolymers which are in powder form are difficult to handle and generally must be polymerized in fluidized bed processes. Additionally, the high molecular weight polyester resins which are made utilizing prepolymers which are in powder form are also in the form of powders which are more difficult to process into articles of manufacture. For these reasons polyester prepolymers in powder form have not been widely utilized in commercial solid state polymerization techniques.

SUMMARY OF THE INVENTION

It has been unexpectedly found that polyester prepolymers in the form of a porous, fibrous mass can be solid state polymerized at very fast polymerization rates to produce high molecular weight resin. In fact, polyester prepolymers in the form of a porous, fibrous mass can be solid state polymerized at a rate which is essentially equivalent to the rate at which powdered prepolymers can be solid state polymerized. Such polyester prepolymers in the form of a porous, fibrous mass can be solid state polymerized in virtually any type of reaction zone, such as a static bed or a fluidized bed. The solid state polymerization can either be conducted under vacuum or in the stream of an inert gas. The resultant high molecular weight polyester resin produced can be processed in conventional equipment which is designed to accept standard pellets or chips of the high molecular weight polyester resin. By utilizing the solid state polymerization technique of this invention, essentially all of the advantages associated with using pellets or chips are realized without being subjected to slow polymerization rates. Additionally, polyester resins having ultra-high molecular weights of greater than 2.0 dl/g can be made. In fact, ultra-high molecular weight resins having IV's of greater than 5.0 dl/g have been made utilizing the process of this invention.

The present invention specifically reveals a process for preparing porous pills which can be solid state polymerized at a very rapid rate into high molecular weight polyester resin which comprises: (1) dissolving a polyester prepolymer in a suitable organic solvent; (2) recovering the polyester prepolymer from the organic solvent to produce a porous, fibrous mass of the polyester prepolymer; and (3) compacting the porous, fibrous mass into the porous pills.

DETAILED DESCRIPTION OF THE INVENTION

This invention is applicable to virtually any polyester which can be solid state polymerized. The most common type of polyesters which will be solid state polymerized using the technique of this invention will have at least about 75 mole percent of their acid moieties being provided by an aromatic dicarboxylic acid, such as terephthalic acid, isophthalic acid, or a naphthalinic dicarboxylic acid (preferably 2,6-) with their diol moieties being provided by glycols such as ethylene glycol, butylene glycol, 1,4-dimethylol cyclohexane and the like or aromatic diols such as hydroquinone and catechol. Such polyesters can also contain other dicarboxylic acids such as adipic acid, isophthalic acid, sebacic acid, and the like. Polyethylene terephthalate (PET), polyethylene isophthalate, polyethylene naphthalate, and polybutylene terephthalate homopolymers are some representative examples of such polyesters that can be solid state polymerized to high molecular weights. Blends of various polyesters can also be polymerized using the process of this invention. For instance, it can be utilized in solid state polymerizing melt blends of polyethylene terephthalate and polyethylene isophthalate. Such blends of polyethylene terephthalate and polyethylene isophthalate have excellent gas barrier properties and are very useful in making packaging materials, such as beverage bottles (see U.S. Pat. No. 4,551,368).

The polyester prepolymers (starting polyesters) utilized in this invention can be made in any manner but are typically prepared by conventional melt polymerization techniques. Thus, conventional temperatures, catalysts, amounts of catalysts, stabilizers, and the like, are utilized in manners well known in the literature and art in making the polyester prepolymer. These polyester prepolymers have an initial starting IV (intrinsic viscosity) of at least about 0.2 dl/g in a 60:40 phenol:tetrachloroethane solvent system at a temperature of 30° C. and at a concentration of 0.4 g/dl. The polyester prepolymers which are solid state polymerized in accordance with this invention will generally have an original or starting IV of from about 0.2 to about 3.0 dl/g. However, the process of this invention can be used to solid state polymerize polyester prepolymers having intrinsic viscosities of greater than 3.0 dl/g. Preferably, the polyester prepolymer used will have a starting IV which is within the range of about 0.3 to 2.0 dl/g. In most cases, the polyester prepolymers will have an original IV within the range of 0.4 to 0.6 dl/g. Virtually any type of polyester prepolymer can be solid state polymerized using the technique of this invention. Such polyester prepolymers are comprised of one or more diacid components and one or more diol components.

The diacid component in the polyesters to which this invention pertains are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component utilized in preparing the polyester prepolymers used in the process of this invention is normally comprised of glycols containing from 2 to 12 carbon atoms, glycol ethers containing from 4 to 12 carbon atoms, and polyether glycols having the structural formula HO—(A—O)—$_n$H wherein A is an alkylene group containing from 2 to 6 carbon atoms and wherein n is an integer from 2 to 400. Generally, such polyether glycols will have a molecular weight of 400 to about 4000. The diol component can be an aromatic diol. Some representative examples of aromatic diols that can be used include 2,2-bis(4-hydroxyphenyl)-propane, resorcinol, hydroquinone, phenyl hydroquinone, 1,4-bis(4-hydroxycumyl)benzene, 1,3-bis(4-hydroxycumyl)benzene, 1,4-bis(3,5-dimethyl 4-hydroxycumyl)benzene, 1,3-bis(3,5-dimethyl 4-hydroxycumyl)benzene, and the like.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. Some representative examples of polyether glycols that can be used include polytetramethylene glycol (Polymeg TM ) and polyethylene glycol (Carbowax TM ).

Branched polyester prepolymers can also be solid state polymerized in accordance with the process of the present invention. Such branched polyesters normally contain branching agents which contain three or more functional groups and preferably contain three or four functional groups. Such reactive functional groups can be carboxyl groups or aliphatic hydroxyl groups. The branching agent utilized in such branched polyesters can optionally contain both carboxyl groups and hydroxyl groups. Examples of acidic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

High strength polyesters which utilize at least one bis-hydroxyalkyl pyromellitic diimide in their diol component can also be solid state polymerized in the form of a porous, fibrous mass. The diol component in such high strength polyesters will normally contain from 5 to 50 mole percent of one or more bis-hydroxyalkyl pyromellitic diimides and will preferably be comprised of from 10 to 25 mole percent of at least one bis-hydroxyalkyl pyromellitic diimide. The remaining portion of the diol component in such high strength polyesters is comprised of additional copolymerizable diols. Such high strength polyesters are described in greater detail in U.S. Pat. No. 4,605,728, which is incorporated herein by reference in its entirety.

The porous, fibrous mass can be prepared by dissolving the polyester prepolymer in a suitable organic solvent and subsequently recovering the polyester prepolymer from the organic solvent in the form of a porous, fibrous mass of the polyester prepolymer. A solution of the polyester prepolymer is prepared by simply dissolving the polyester prepolymer in a suitable organic solvent. The solution of the polyester prepolymer prepared can be dilute or saturated. In commercial operations, it is generally preferred for the polyester prepolymer solution to be highly concentrated or saturated. Such solutions are prepared by simply mixing the polyester prepolymer into the organic solvent utilizing sufficient shearing forces so as to dissolve the polyester prepolymer within a reasonable time period.

A wide variety of solvents or solvent systems capable of dissolving the polyester at room temperature or at a slightly elevated temperature can be employed. It is preferred for the solvent used to have a low boiling point so that residual solvent can be more easily removed from the porous, fibrous mass by evaporation prior to the solid state polymerization. Some representative examples of suitable solvents include nitro-benzene, acetonapthone, hexafluoroacetone, hexafluoroisopropanol, meta-cresol, trifluoroacetic acid/methylene chloride mixed solvent systems, nitro-benzene/tetrachloroethane mixed solvent systems, hexafluoroisopropanol/chloroform mixed solvent systems, and tetrachloroethane/phenol mixed solvent systems. Trifluoroacetic acid/methylene chloride mixed solvent systems which contain from about 25 weight percent to about 75 weight percent trifluoroacetic acid and from about 25 weight percent to about 75 weight percent methylene chloride are preferred. It is generally more preferred for such solvent systems to contain from about 40 to about 60 weight percent tetrafluoroacetic acid and from about 40 to about 60 weight percent methylene chloride.

After the solution of the polyester prepolymer in the organic solvent is prepared, the porous, fibrous mass of polyester prepolymer can be recovered. This can be accomplished by utilizing a number of different techniques. For instance, a porous, fibrous mass of the polyester prepolymer can be recovered from the solution by coagulation. In such a coagulation process, the solution of polyester prepolymer can be coagulated by simply pouring it into an organic solvent which is capable of dissolving the solvent utilized in the polyester prepolymer solution but which is not a good solvent for the polyester prepolymer, such as alcohols or ketones. Some representative examples of alcohols and ketones that can be used include methanol, ethanol, isopropyl alcohol, cyclohexanol, n-butyl alcohol, isobutyl alcohol, s-butyl alcohol, t-butyl alcohol, acetone, methyl ethyl ketone, methyl phenyl ketone, cyclohexenone, and the like. This is preferably done by pouring one or more thin streams of the polyester prepolymer solution into the solvent being utilized for coagulation. It will normally be advantageous to vigorously stir or agitate the organic solvent utilized for coagulation into which the polyester prepolymer solution is being poured. A porous, fibrous mass of the polyester prepolymer can then easily be recovered from the organic medium used in the coagulation by decantation or filtration. Squeeze rollers can be used to squeeze residual solvent out of the porous, fibrous mass of the polyester prepolymer which is recovered. Additional residual solvent can be removed by evaporation. The evaporation of residual solvent can be accelerated by heating the porous, fibrous mass of the polyester prepolymer to a slightly elevated temperature. This drying temperature will normally be below the glass transition temperature of the polyester prepolymer in order to inhibit hydrolysis. In the case of PET prepolymers, a drying temperature which is within the range of about 50° C. to about 100° C. will normally be used. It is generally preferable to utilize a drying temperature which is within the range of about 85° C. to about 90° C. in drying a porous, fibrous mass of PET prepolymer. It is also desirable to utilize vacuum in such low temperature drying procedures.

A porous, fibrous mass of the polyester prepolymer can also be recovered from the solution of polyester prepolymer by centrifuging small streams of the solution into an inert heated gas medium. This process is similar to the technique utilized in making cotton candy. In this technique the organic solvent quickly evaporates into the heated inert gas.

After the porous, fibrous mass of the polyester prepolymer is recovered, it will generally be desirable to process the porous, fibrous mass into the form of cubes, chips, pellets, cylinders, discs, spheres, rods, or the like to make handling of the porous, fibrous mass easier. This can be done by simply compacting the porous, fibrous mass recovered into the desired form (porous pills). For example, porous pills of the porous, fibrous mass of polyester prepolymer which are suitable for use in the process of this invention can be made by simply compacting the porous, fibrous mass recovered into the desired form. A pressure of at least about 1 ton per square inch ($1.379 \times 10^7$ Pascals) will normally be utilized in such compaction procedures. As a general rule, pressures within the range of about 1 to about 40 tons per square inch (1.379×10⁷ to 5.2516×10⁸ Pascals) will be utilized for compacting the porous, fibrous mass recovered into the physical form desired for solid state Polymerization. It is, of course, also possible to utilize even higher pressures to compact the porous, fibrous mass into the desired physical form. However, there is generally no benefit associated with utilizing higher pressures for this compaction technique. The temperature at which the compaction is carried out is not critical. However, in most cases, the compaction will be conducted at a temperature within the range of about −20° C. to about 150° C. with temperatures of 10° C. to 50° C. being more common. It will normally be appropriate to compact the porous, fibrous mass recovered into the desired form at room temperature.

The optimal size and shape of the porous pills of the porous, fibrous mass prepared is dependent upon the type of solid state polymerization that will be conducted and upon the solid state polymerization equipment which will be utilized. For instance, the optimal size and shape of the porous pills is dependent upon whether the solid state polymerization will be carried out in a fixed bed, a fluidized bed, or a moving bed reactor. In any case, satisfactory porous pills of the porous, fibrous mass of polyester prepolymer of virtually any size or shape can be prepared and utilized in the solid state polymerizations of this invention. However, such porous pills of the porous, fibrous mass of polyester prepolymer will generally have a weight which is within the range of about 0.02 grams to about 0.5 grams.

The density of porous pills made utilizing a porous, fibrous mass of polyester prepolymer in accordance with the process of this invention is naturally lower than the density of standard pellets or chips which are comprised of the same polyester having the same crystallinity.

For instance, solid pellets which are comprised of polyethylene terephthalate prepolymer have a density that ranges from about 1.33 grams per cubic centimeter at a crystallinity of 0% to a density of about 1.46 grams per cubic centimeter at a crystallinity of 100%. Porous pills which are comprised of polyethylene terephthalate prepolymer typically have a density within the range of 1.0 to 1.3 grams per cubic centimeter at a crystallinity of 25%. Standard polyethylene terephthalate chips have a density of about 1.36 grams per cubic centimeter at a crystallinity of 25%. In most cases porous pills which are comprised of a given polyester prepolymer will have a density within the range of about 15% to about 96% of the density of solid polyester pellets which are comprised of the same polyester prepolymer. It is generally preferred for such porous pills to have a density of 85% to 93% of the sensity of solid polyester pellets which are comprised of the same polyester prepolymer in commercial operations to reduce shipping costs. However, it is preferred for the porous pills to have a density of about 20% to about 50% of the density of solid polyester pellets which are comprised of the same polyester if ultra-high molecular weights are desired. The porous, fibrous masses of this invention have lower densities because they contain a significant amount of void space. The void space in the porous, fibrous mass is comprised of a substantial amount of open pores or cavities which penetrate the mass or porous pill. These cavities form passage ways through which water, glycols, acetaldehyde, and other reaction by-products which are formed in the solid state polymerization can more readily escape from the inner most portions of the porous, fibrous mass. In other words, the porous, fibrous mass contains a substantial volume of interstices which penetrate it and open to the outside. Porous pills made from the porous, fibrous mass also contain a substantial volume of interstices which penetrate the porous pills and open to the outside. This results in the reaction by-products having a shorter "free path" for escape.

The polyester prepolymer in the porous pills can optionally be converted to a higher degree of crystallinity prior to solid state polymerization in order to raise the sticking temperature of the porous, fibrous pellets. This is done in order to reduce the possibility of the porous pills sticking together as a solid mass in the solid state polymerization zone. Preferably, the surfaces of the porous pills being solid state polymerized will have a crystallinity of at least about 20%. Porous pills have less tendency to stick together if their surface is crystallized even though they may be composed of amorphous polyester on the inside. Increased crystallinity can be achieved by any suitable treatment, such as by controlled heating of the porous pills or by treating the porous pills with the vapor of a suitable organic solvent.

The sticking temperature of crystalline or partially crystalline polyethylene terephthalate prepolymers is about 230° C. which is much higher than their sticking temperature in the amorphous state which is about 100° C. to 150° C. Polyester prepolymers are commonly crystallized to a crystallinity of at least about 20% prior to solid state polymerization. Typically, a polyester prepolymer can be converted to about 20% to 40% crystallinity by heating at 150° C. for 5 minutes to 300 minutes. At lower crystallization temperatures, longer heating times are normally required. Suitable time-temperature relationships can be easily determined by persons having skill in the art.

The amount of time required to crystallize the surfaces of porous pills by vapor treatment will vary with the concentration of the vapor, with the type of volatile organic compound being utilized, with the type of polyester prepolymer being utilized and with the crystallinity desired. Since vapor treatment crystallizes the porous pills from their surface inward, generally a lower degree of crystallinity is required to prevent porous pills made out of the polyester prepolymer from sticking than is required when the porous pills are crystallized utilizing a thermal treatment. This increased degree of crystallization in the porous pills is attained by simply exposing the porous pills to the vapors of a suitable organic compound, such as a volatile chlorinated hydrocarbon, a volatile ketone, tetrahydrofuran, ethylene oxide, or propylene oxide. Methylene chloride and acetone are particularly preferred volatile organic compounds for utilization in such vapor crystallizations.

The porous pills can optionally be crystallized in a high frequency energy field. This can be done by subjecting the porous pills to high frequency energy having a frequency which is within the range of about 20 to about 300 megahertz for an exposure time of 20 to 90 seconds. U.S. Pat. No. 4,254,253 describes this process in greater detail and is incorporated by reference herein in its entirety.

The porous, fibrous mass of polyester prepolymers can be solid state polymerized in accordance with the process of this invention in a batch or continuous process. It will generally be preferred to convert the porous, fibrous mass of polyester prepolymer into porous pills prior to solid state polymerization. This is because such porous pills can be solid state polymerized in standard equipment. Suitable solid state polymerization temperatures can range from a temperature just above the threshold temperature of the polymerization reaction up to a temperature within a few degrees of the sticking temperature of the porous pills which can be well below their melting point.

The solid state polymerization temperature utilized will typically be from about 1° C. to about 50° C. below the sticking temperature of the porous pills which are comprised of polyester prepolymer. The optimum solid state reaction temperature will differ somewhat for prepolymers of different compositions and of different molecular weights. As a general rule, the optimum solid state polymerization temperature for porous pills will be from about 5° C. to about 20° C. below their sticking temperature. For example, in the solid state polymerization of porous pills comprised of polyethylene terephthalate, the highest temperatures which can normally be employed range from 240° C. to about 255° C. which is just below the sticking temperature and melting point of this polyester. Generally, the polyethylene terephthalate will be solid state polymerized at a temperature of from about 210° C. to about 255° C. In most cases, polyethylene terephthalate will be solid state polymerized at a temperature of from 230° C. to 250° C.

As the solid state polymerization of a polyester prepolymer proceeds, its sticking temperature can increase. Thus, the solid state polymerization temperature can be incrementally increased during the course of the polymerization. For example, in the case of polyethylene terephthalate the process described in U.S. Pat. No. 3,718,621, which is incorporated herein by reference in its entirety, can be utilized.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with porous pills which are comprised of polyester prepolymer which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the porous pills in it. It should be noted that most of the inert gas flows around the porous pills of polyester prepolymer as it streams through the solid state polymerization zone.

Some suitable inert gases for use in the solid state polymerization process of this invention include nitrogen, carbon dioxide, helium, argon, neon, krypton, xenon, and certain industrial waste gases. Various combinations or mixtures of different inert gases can also be used. In most cases nitrogen will be used as the inert gas.

The total amount of inert gas needed to solid state polymerize a polyester prepolymer into a high molecular weight polyester resin in a given solid state polymerization reactor at a given temperature can be greatly reduced by pulsing the inert gas through the polyester prepolymer. The minimum amount of inert gas that needs to be pulsed through a given polyester prepolymer per unit time per unit weight will vary with the polyester, the solid state polymerization temperature used, and the design of the polymerization reactor. The optimum manner of pulsing the inert gas through the porous pills will also vary with the type of polyester used, the polymerization temperature used, and the design and size of the polymerization reactor. Usually, between about 0.05 and about 2 liters of inert gas per hour will be pulsed through the polyester prepolymer per kilogram of the polyester prepolymer. Generally the best way to pulse the inert gas through the polyester prepolymer being solid state polymerized is to repeatedly turn the flow of inert gas on and off. U.S. Pat. No. 4,532,319, which is incorporated herein by reference in its entirely describes this technique for reducing the consumption of inert gas in greater detail.

The solid state polymerization zone can be of virtually any design that will allow the polyester prepolymer to be maintained at the desired solid state polymerization temperature for the desired residence time and which allows for removal of reaction by-products, such as acetaldehyde. Such solid state polymerization zones can be reactors which have a fixed bed, a static bed, a fluidized bed, or a moving bed. In most cases, it is preferred to utilize a tubular polymerization reactor wherein the porous pills flow through the reactor for the desired residence time. Such tubular reactors have a substantially uniform cross-section and a sufficient height to allow the porous pills to flow by reason of the force of gravity from the top to the bottom of the reactor in the desired residence time. In other words, the porous pills move from the top to the bottom of such a tubular polymerization reactor in a partially dammed state. The rate of flow through such a reactor can be controlled by regulating discharge at the bottom of the reactor. It is generally preferred to allow an inert gas to flow countercurrently (upwardly) through the reactor at a gas velocity well below the turbulence point so that the porous pills are not fluidized (always remain in contact with each other). The porous pills remain in substantially the same physical form throughout the solid state polymerization process.

The polyester prepolymer will be solid state polymerized for a time sufficient to increase its molecular weight or IV to that of the high molecular weight polyester resin desired. It will be desirable for the high molecular weight polyester resin being prepared to have an IV of at least 0.65 dl/g. In most cases the high molecular weight resin will have an IV of at least 0.7 dl/g and for many applications will preferably have an IV of at least about 1.0 dl/g. Polyester resins having an IV of greater than 3.0 dl/g are useful in some applications and can be made by using the process of this invention. It is even possible to make polyester resin having an IV of greater than 5.0 dl/g using the technique of this invention. In fact, ultra-high molecular weight polyethylene terephthalate resin having an IV of 5.3 dl/g can be made in a solid state polymerization time of 6 hours starting with a prepolymer having an IV of 1.9 dl/g.

The polymerization time required to increase the molecular weight of the polyester prepolymer to a given desired molecular weight will, of course, vary with the polymerization temperature used, the IV of the polyester prepolymer utilized, and with the final IV desired. Very long polymerization times can be utilized if ultra-high molecular weight polyester resins are desired. In most cases the polymerization times utilized in carrying out the process of this invention will range from about 30 minutes to about 12 hours. In most cases it will be preferred to utilize a polymerization time ranging between about 1 hour and about 8 hours. Such solid state polymerizations can, of course, be carried out utilizing batch, semi-continuous, or continuous techniques. In the case of continuous solid state polymerizations, the polymerization times referred to are residence times in the solid state polymerization reaction zone.

The polyester prepolymers which are solid state polymerized in accordance with this invention can be produced utilizing conventional melt polymerization techniques or can be prepared utilizing solid state polymerization techniques. For instance, a polyester prepolymer having an intrinsic viscosity of 0.4 can be produced utilizing conventional melt polymerization techniques. The polyester having an IV of 0.4 can then be solid state polymerized to an IV of 1.0 utilizing conventional solid state polymerization techniques. The polyester resin having an IV of 1.0 can then be used as a polyester prepolymer in the solid state polymerization of this invention so as to produce a polyester resin having an intrinsic viscosity of 5.0. It is, of course, also possible to use polyester resins which have been prepared by utilizing the solid state polymerization technique of this invention as the prepolymer for subsequent polymerizations which, again, utilize the technique of this invention. In other words, polyester resins which have been prepared by solid state polymerizing a porous, fibrous mass of polyester prepolymer can be utilized as the prepolymer in subsequent solid state polymerizations.

This invention is illustrated by the following examples which are merely for the purpose of illustration and are not to be regarded as limiting the scope of the invention or the manner in which it can be practiced. Unless specifically indicated otherwise all parts and percentages are given by weight. The IV's of the high molecular weight polyester resins produced were measured in a 50/50 trifluoroacetic acid/methylene chloride mixed solvent system. The final IV's reported herein were adjusted to conform to IV's as measured in 60/40 phenol/tetrachloroethane solvent systems at 30° C. This was done because the high molecular weight resins produced are not soluble in the phenol/tetrachloroethane mixed solvent system but are soluble in the trifluoroacetic acid/methylene chloride mixed solvent system.

EXAMPLE 1

In this experiment an ultra-high molecular weight PET resin was prepared. In the first step of the procedure utilized a 50 ml Ehrlenmeyer flask containing a magnetic spin bar was charged with 5 grams of PET prepolymer having an IV of 1.9 dl/g and 40 ml of a 50/50 trifluoroacetic acid/methylene chloride mixed solvent system. The mixture was stirred at room temperature for 4 hours so as to produce a solution of the PET prepolymer in the mixed solvent system. The viscous solution produced was slowly poured in a thin stream into the vortex of a rapidly stirred beaker containing methanol. This resulted in coagulation with an opaque methanol-rich gel being produced. The gel which resulted from the coagulation was transferred to a Waring blender and was washed with 400 ml of methanol for 1 minute to remove much of the residual trifluoroacetic acid and methylene chloride. The resulting porous, fibrous mass was filtered in a Buchner funnel utilizing Whatman No. 1 filter paper and was returned to the Waring blender for a second washing with methanol and filtration. The porous, fibrous mass was then washed in boiling methanol for 5 minutes and subsequently filtered. The porous, fibrous mass of polyester prepolymer was then dried in a vacuum oven for 1 hour at about 62° C. plus or minus 2° C. and finally at 78° C. plus or minus 1° C. for about 16 hours.

Porous pills of the polyester prepolymer were prepared by compressing 0.3 to 0.4 grams of the porous, fibrous mass in a stainless steel Parr pellet press (Sargent Welch S-13630). Cylindrical porous pills were prepared in the Parr pellet press utilizing a 0.5 inch (1.27 cm) diameter die. The porous pills weighed 0.3 grams, had a thickness of 0.210 inches (0.51 cm), and had a bulk density of 0.464 g/cc.

The porous pills were placed in a solid state polymerization reactor tube which had an inside diameter of 1.125 inches (2.86 cm) and was 12 inches (30.48 cm) long. The solid state polymerization reactor tube contained a porous, fritted disc at its bottom and was equipped with a glass spiral coil through which 14 cubic feet per hour (396.4 liters per hour) of dry nitrogen entered the reactor tube below the glass frit. The entire solid state polymerization reactor tube was placed in a temperature controlled oil bath and was heated incrementally to prevent sticking. The rapid flow of nitrogen gas maintained the porous pills in a fluidized state. The temperature was incrementally increased up to 240° C. and the solid state polymerization was allowed to proceed for about 7 hours.

The PET resin produced was determined to have an IV of 5.15 dl/g. This is equivalent to a number average molecular weight of about 436,000. This experiment clearly shows that the technique of this invention can be utilized to prepare polyester resins having ultra-high molecular weights of greater than 5.0 dl/g.

EXAMPLE 2

The procedure specified in Example 1 was repeated in this experiment except that the porous pills prepared had a thickness of 0.54 cm and a bulk density of 0.439 g/cc. Additionally, in this experiment a maximum solid state polymerization temperature of 235° C. and a solid state polymerization time of about 8 hours were utilized. This experiment resulted in the production of a polyester resin having an IV of 4.14 dl/g. The ultra-high molecular weight PET resin produced accordingly had a number average molecular weight of 317,000.

EXAMPLE 3

The procedure utilized in Example 2 was repeated in this experiment except that the porous pills utilized had a thickness of 0.32 cm and had a bulk density of 0.728 g/cc. The ultra-high molecular weight PET resin produced in this experiment had an IV of 3.86 dl/g. This is equivalent to a number average molecular weight of 286,000.

EXAMPLE 4

The procedure utilized in Example 2 was repeated in this experiment except that the porous pills utilized had a thickness of 0.27 cm and a bulk density of 0.888 g/cc. Additionally, a solid state polymerization time of about 10 hours was utilized. In this experiment the polyester resin produced had an intrinsic viscosity of 3.6 dl/g. This represents a number average molecular weight of about 258,000.

EXAMPLE 5

In this experiment porous pills having a bulk density of 0.436 g/cc were made utilizing the procedure described in Example 1. The porous pills which were made from PET prepolymer having an IV of 1.9 dl/g were then placed in an open vial and charged into a vacuum over (Napco 5831) which was equipped with a dry ice/acetone trap. The porous pills were then heated to a temperature of 155° C. under vacuum for a period of 1.5 hours. The high molecular weight PET resin produced had an IV of 2.27 dl/g which is equivalent to a number average molecular weight of 131,000. This experiment shows that porous pills which are comprised of PET prepolymer can be solid state polymerized under vacuum at very low temperatures.

EXAMPLE 6

The procedure utilized in Example 5 was repeated in this experiment except that the porous pills had a bulk density of 0.455 g/cc. The PET resin produced had an IV of 2.24 dl/g. This example shows the excellent reproducibility of the solid state polymerization with respect to the final IV of the resin being produced.

EXAMPLE 7

In this experiment porous pills were made from PET prepolymer having an IV of 1.9 dl/g utilizing the procedure specified in Example 1. The porous pills made had a bulk density of 0.438 g/cc. The porous pills were heated under vacuum at 78° C. for 1 hour in a Napco 5831 vacuum oven. The temperature in the oven was then increased to 155° C. and the oven was maintained at that temperature for 6 hours. The high molecular weight PET resin produced had an IV of 2.53 dl/g which is equivalent to a number average molecular weight of 154,000.

EXAMPLE 8

The procedure utilized in Example 7 was repeated in this experiment except that the vacuum oven was maintained at 155° C. for a period of 24 hours. The high molecular weight PET resin produced had an IV of 2.96 dl/g which is equivalent to a number average molecular weight of 193,000.

Variations in the present invention are possible in light of the description of it provided herein. It is, therefore, to be understood that changes can be made in the particular embodiments described which will be within the full intended scope of the invention as defined by the following appended claims.

What is claimed is:

1. The porous pills made by a process which consists essentially of (1) dissolving a polyester prepolymer in a suitable organic solvent; (2) recovering the polyester prepolymer from the organic solvent to produce a porous, fibrous mass of the polyester prepolymer; and (3) compacting the porous, fibrous mass into the porous pills.

2. The porous pills as specified in claim 1 wherein the polyester prepolymer has an intrinsic viscosity which is within the range of about 0.3 to about 2.0 dl/g.

3. The porous pills as specified in claim 1 wherein the polyester prepolymer is recovered from the organic solvent in the form of a porous, fibrous mass by coagulation.

4. The porous pills as specified in claim 1 wherein the polyester prepolymer is polyethylene terephthalate.

5. The porous pills as specified in claim 1 wherein the polyester prepolymer is polyethylene naphthalate.

6. The porous pills as specified in claim 1 wherein said polyester prepolymer is comprised of repeat units which are derived from a diacid component and a diol component; wherein said diacid component is at least one member selected from the group consisting of alkyl dicarboxylic acids which contain from 4 to 36 carbon atoms, diesters of alkyl dicarboxylic acids which contain form 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms and wherein said diol component is at least one member selected from the group consisting of glycols containing from 2 to 12 carbon atoms, glycol ethers containing from 4 to 12 carbon atoms, and polyether glycols having the structural formula HO-(A-O)$_n$-H wherein A is an alkylene group containing from 2 to 6 carbon atoms and wherein n is an integer from 2 to 400.

7. The porous pills as specified in claim 6 wherein the polyester prepolymer has an intrinsic viscosity of at least about 0.2 dl/g.

8. The porous pills as specified in claim 4 wherein the polyester prepolymer has an intrinsic viscosity which is within the range of about 0.3 to 2.0 dl/g.

9. The porous pills as specified in claim 8 wherein the organic solvent is a trifluroracetic acid/methylene chloride mixed solvent system.

10. The porous pills as specified in claim 9 wherein the coagulation is done by utilizing a member selected from the group consisting of alcohols and ketones.

11. The porous pills as specified in claim 9 wherein the organic solvent is comprised of from about 25 to about 75 weight percent trifluoroacetic acid and from about 25 to about 75 weight percent methylene chloride.

12. The porous pills as specified in claim 11 wherein the coagulation is done by utilizing an alcohol.

13. The porous pills as specified in claim 12 wherein the alcohol is methanol.

14. The porous pills as specified in claim 4 wherein the polyester prepolymer has an intrinsic viscosity which is within the range of about 0.4 to about 0.6 dl/g.

15. The porous pills as specified in claim 9 wherein the organic solvent is comprised of from about 40 to about 60 weight percent trifluoroacetic acid and from about 40 to about 60 weight percent methylene chloride.

16. The porous pills as specified in claim 4 wherein the organic solvent is a member selected from the group consisting of nitro-benzene, acetonapthone, hexafluoroacetone, hexafluoroisopropanol, meta-cresol, trifluoroacetic acid/methylene chloride mixed solvent systems, nitro-benzene/tetrachlorethane mixed solvent systems, hexafluoroisopropanol/chloroform mixed solvent systems, and tetrachloroetyane/phenol mixed solvent systems.

17. The porous pills as specified in claim 12 wherein the alcohol is a member selected from the group consisting of methanol, ethanol, isopropyl alcohol, cyclohexanol, n-butyl alcohol, isobutyl alcohol, s-butyl alcohol, and t-butyl alcohol.

18. The porous pills as specified in claim 4 wherein the porous, fibrous mass is compacted into the porous pills at a temperature which is within the range of about 10° C. to about 50° C.

19. The porous pills as specified in claim 18 wherein the porous, fibrous mass is compacted into the porous pills at a pressure which is within the range of about 1 ton per square inch to about 40 tons per square inch.

* * * * *